April 27, 1954
C. B. GRAY
2,676,403
HAND-HELD MOTOR-DRIVEN SHEAR
Filed Oct. 10, 1951
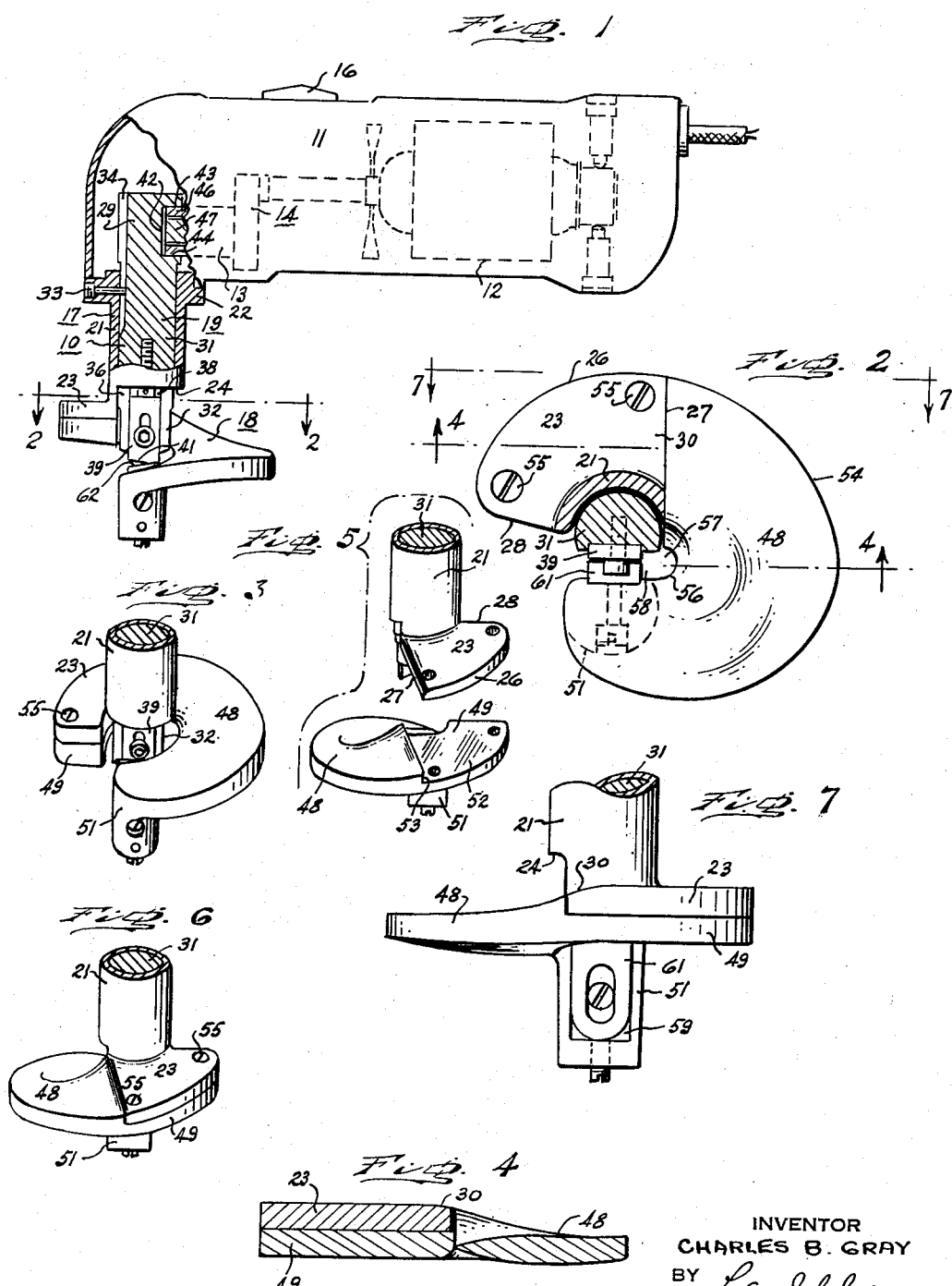
INVENTOR
CHARLES B. GRAY
BY
ATTORNEY Patented Apr. 27, 1954

2,676,403

UNITED STATES PATENT OFFICE 2,676,403

HAND-HELD MOTOR-DRIVEN SHEAR

Charles B. Gray, Springfield, Pa.; Rosa Gray, executrix of said Charles B. Gray, deceased Application October 10, 1951, Serial No. 250,730

1 Claim. (Cl. 30—241)

This invention relates generally to tools for cutting sheet metal and similar stock and is more particularly concerned with an improved construction of hand-held, electrically operated shears affording particular advantage as to the replacement of broken or damaged parts without undue restriction of the utility of the tool.

Known motor driven sheet metal cutting tools commonly are constructed with a frame mounting, a motor having a power shaft operated by the motor and imparting reciprocating motion to a member mounting a shear blade. One class of such tools is provided with an anvil having a vertically extending portion affording guiding means for a reciprocable member carrying a cutter blade and a holding portion for the fixed blade, both of the aforementioned portions being integrally formed with, and disposed at opposite ends of, a deflector plate having an upper flat surface spiralling smoothly downward from one side of the base of the vertically extending guiding portion to the other side thereof and terminating in the holding portion for the fixed blade. In another class of such tools the means for guiding the reciprocating member is not integral with the anvil, which is a member generally arcuate in shape and comprising a horizontal attaching portion and a holding portion for the fixed blade, both of the aforementioned portions being integrally formed with, and disposed at opposite ends of, a deflector plate having an upper flat surface which is depressed relative to the upper flat surface of the attaching portion. The attaching portion is detachably secured to the underside of a complemental flange projecting from one side of a base portion of the vertically extending guiding means, and when the attaching portion is so secured in place, the depressed upper flat surface of the deflector plate spirals smoothly downward from the attaching portion to the other side of the vertically extending guiding means and terminates in the holding portion for the fixed blade. Neither of the aforementioned constructions has proved to be entirely satisfactory. When the guiding means is made integral with the anvil, the cost of replacing the part when broken or injured in operation is unduly high, and when the guiding means is not made integral with the anvil, the upper flat surfaces of the complemental flange and the deflector plate do not merge smoothly, and, consequently, the utility of the tool is unduly limited with regard to making cuts along a line curving to the right. Accordingly, it is an object of this invention to provide a motor driven sheet metal cutting tool with suitable means for guiding the reciprocable member and with a separate anvil detachably securable thereto in working position in a manner which avoids undue restriction of the usefulness of the tool.

Other objects and advantages of the present invention will appear more fully hereinafter, it being understood that the present invention consists in the combination, construction, location and relative arrangement of parts, all as will be more fully described hereinafter, as is shown in the accompanying drawings and will be pointed out in the appended claim.

In the accompanying drawings:

Figure 1 is a side elevation of a shear constructed in accordance with and embodying the principles of the invention, part being shown in section.

Figure 2 is an enlarged plan section on line 2—2 of Figure 1.

Figure 3 is a perspective plan section on line 2—2 of Figure 1.

Figure 4 is a section on line 4—4 of Figure 2.

Figure 5 is a perspective elevation showing the anvil separated from the rest of the operating head of the tool.

Figure 6 is a perspective elevation showing the pieces of Figure 5 assembled.

Figure 7 is an elevation on line 7—7 of Figure 2.

Referring now more particularly to the drawings, it will be observed that the tool of the present invention is of a form and construction adapted to be held conveniently in the hand of the operator, the operating head of the tool, designated generally by the reference numeral 10, being secured to the forward end of a casing 11 in which is housed an electric motor 12 for driving a main shaft 13 through the intervention of a gear train designated generally by the numeral 14. The construction of the casing 11 and the design and disposition of the motor 12 and the gear train 14 therein may be varied as desired, it being merely noted in this connection that the casing 11 is adapted to be conveniently held in the hand of the operator and is fitted with a finger actuated electric switch 16 for controlling the operation of the motor.

The operating head 10 comprises a guide sleeve 17 and an anvil 18 depending from the casing 11, and a member 19 reciprocably mounted within the guide sleeve 17. The latter has a tubular body portion 21 and opposite end portions provided respectively with flanges 22 and 23. The flange 22 is rigidly secured in any suitable manner to casing 11, guide sleeve 17 being disposed thereby in subjacent relation to casing 11 and in vertical alignment with an opening formed therein. The flange 23 extends radially from the lower end portion of guide sleeve 17 and is disposed on the right side thereof as viewed by one holding the tool, the unflanged part of the lower end portion of guide sleeve 17 being cut away as at 24 to form a set back from flange 23. The flange 23 is generally of sector shape as viewed in top plan (see Figure 2), its inner edge being coincident with the external surface of the tubular body portion 21 and its outer edge 26 being curved generally along an arc having a center coincident with the vertical axis of the tubular portion 21. The opposite side edges of the flange 23 are relatively convergent toward the central axis of portion 21, the side edge 27 being normal to the longitudinal axis of the casing 11 and generally tangent to the internal surface of the tubular body portion 21 while the opposite side edge 28 parallels a line extending radially from the central longitudinal axis of the tubular member 21. In addition, the marginal edge 27 of the flange 23 is slightly tapered, as at 30.

The member 19 reciprocably mounted within the guide sleeve 17 is made from round stock and is provided with a head portion 29 disposed above tubular sleeve 21, a body portion 31 reduced from the head portion 29 and slidably received by tubular sleeve 21, and a blade mounting portion 32 reduced from the body portion 31. Extending inwardly through a forward portion of flange 22 is a threaded guiding screw 33 having an end portion disposed to engage a V-groove 34 extending the full length of the head portion 29 and part way down the body portion 31.

The left side of the lower extremity of reciprocable member 19 is cut away to form a recess having a vertical base surface 36 and a horizontal end surface. The base surface 36 is provided with a channel 38 extending lengthwise thereof, and adjustably secured in channel 38 in a suitable manner is a blade 39 having a beveled cutting edge 41 formed at the lower extremity thereof and disposed below the blade mounting portion 32. Extending transversely across the rear of the head portion 29 is an open cut having a vertical base surface 42 and horizontal side surfaces 43 and 44. The open cut receives a tubular sleeve 46 having diametrically opposed portions disposed to abut respectively horizontal side surfaces 43 and 44 for sliding movement lengthwise of the open cut, and the tubular sleeve 46 is fitted over an eccentric end portion 47 of main shaft 13.

The anvil 18 which forms an adjunct of the guide sleeve 17 and with the latter depends from the casing 11, includes a deflector plate 48 integrally formed with an attaching portion 49 and a blade holding portion 51 at opposite ends thereof. The attaching portion 49 of anvil 18 is cut away to form a depressed horizontal base surface 52 having a sharply defined shoulder 53. The attaching portion 49 is detachably rigidly secured in subjacent relation to flange 23 by means of threaded screws 55 which pass through openings in the latter and engage tapped aligned openings in the former, the heads of threaded screws 55 being disposed in suitable depressions which position the top of the screws flush with the upper surface of flange 23. When thus secured in place the horizontal base surface 52 and the shoulder 53 thereof abut respectively the lower face of flange 23 and the edge 27 of the latter, it being noted that the attaching portion 49 corresponds in outline with that of the flange 23 so that the corresponding edges of the parts 23 and 49 are substantially coincident when said parts are secured together.

The deflector plate 48 formed integrally with attaching portion 49 is of generally arcuate shape in top plan, the upper flat surface of the portion spiraling downward from the tapered surface 30 of flange 23 at one end thereof toward the other end thereof, the thickness of the deflector plate 48 being reduced from its outer peripheral edge 54 inward toward its inner edge 56. The latter edge follows a curvature of extremely small radius to provide an opening 57 which laterally communicates with an open-ended notch 58 extending lengthwise of the shear head in the immediate region of the movable blade 39.

Extending downwardly from the depressed end of the spiral deflector plate 48 is the integrally formed blade-holding portion 51 in the form of a solid post of generally cylindrical shape. The right side of the post has a channel 59 cut therein and extending lengthwise thereof, and adjustably secured in channel 59 in a suitable manner is a blade 61 having a beveled cutting edge 62 formed at the upper extremity thereof and disposed above the blade holding portion 51 for coaction with cutting edge 41.

In operation, the casing 11 of the tool is grasped by the operator's hand, and when switch 16 is in its on position the motor 12 rotates main shaft 13 through gear train 14. As the main shaft 13 rotates, the eccentric end portion 47 thereof and the tubular sleeve 46 carried thereby are moved bodily in a circular path. The horizontal component of such movement does not affect the action of member 19 because of the sliding movement of tubular sleeve 46 in the rearwardly facing open cut in head portion 29, however, the vertical component of such movement effects vertical reciprocation of member 19 in tubular body portion 21. The end portion of guiding screw 33, which is disposed in V-groove 34, coacts therewith to keep reciprocating member 19 from turning in tubular body portion 21 while at the same time permitting relative vertical sliding movement. It will be noted that when the reciprocable member 19 is in its lowermost position the body portion 31 thereof extends down to, but not beyond, the lower face of flange 23, the rounded surface of blade mounting portion 32 being set back from the opposed inner edge of attaching portion 49 of anvil 18.

When the cutting blades 39 and 61 are respectively mounted in position, the shearing edges 41 and 62 thereof respectively are so angularly related as to permit free and easy feeding of sheet material to be cut between and through the edges of the blades. Of course, in practice the tool is generally fed into and through the material along prescribed lines of cut, during which operation the sheared edges of the material are respectively deflected above and below the deflector plate 48 so that one portion of the sheared material rests upon the upper surface of the deflector plate 48 and the other portion rides beneath the deflector plate 48 in close contact with its lower surface. It will be noted that on account of the smoothly merging upper surfaces of flange 23 and deflector plate 48, there is no obstruction to prevent the sheared material, resting upon the upper surface of deflector plate 48, from approaching the tubular sleeve 21 when cutting the material along a line curved to the right. In view of the foregoing, the line of such a cut may curve from a straight line to a curved line of a radius as small as that of the tubular sleeve 21.

As a result of the impact from repeated shearing strokes, or from other cause, the anvil is sometimes injured or broken, and it will be understood that such damage to the tool may be repaired conveniently and cheaply by merely removing screws 55, placing a fresh anvil in position and then replacing the screws, and that applicant has provided a means for doing this without sacrifice in the utility at the tool.

It will be understood, of course, that the present invention is susceptible of various changes and modifications which may be made from time to time without departing from the general principles and real spirit of the invention, and accordingly, it is intended to claim the same broadly, as well as specifically, as indicated by the appended claim.

What is claimed as new and useful is:

In an operating head for a shearing tool having an electric motor carried by a casing adapted to be held in the operator's hand, a sleeve adapted to be rigidly secured to the casing and in the normal use of the tool to depend therefrom, said sleeve being provided on one side at the lower extremity thereof with an external flange, an elongated member provided with cutting means and mounted in said sleeve for axial movement, said elongated member being adapted for actuation by said motor, and an arcuately shaped anvil one end portion of which is disposed in underlying relation to said flange and detachably secured thereto, said flange and underlying anvil portion being substantially of the same thickness, said anvil being provided intermediate the opposite ends thereof with a laterally extending integral fillet which abuts said flange, the fillet-abutting marginal flange portion being bevelled to provide a flange surface portion disposed in smooth continuation of the surface of said fillet and having substantially the same slope as said fillet, and said flange and anvil being provided with an upwardly presenting work supporting surface which includes the aforesaid surfaces of said fillet and abutting marginal flange portion and which spirals downwardly away from said flange around to the other side of said sleeve to the opposite end portion of said anvil, the latter end portion being provided with cutting means positioned for suitable coaction with said first mentioned cutting means.

References Cited in the file of this patent
UNITED STATES PATENTS

| Number | Name | Date |
|---|---|---|
| 2,454,728 | White | Nov. 23, 1948 |
| 2,482,582 | Grafe | Sept. 20, 1949 |
| 2,567,129 | Schoffner | Sept. 4, 1951 |
| 2,631,370 | Gray | Mar. 17, 1953 |